US006944464B2

(12) United States Patent
Muranaga (10) Patent No.: US 6,944,464 B2
(45) Date of Patent: Sep. 13, 2005

(54) METHOD AND SYSTEM FOR SENDING AN EMERGENCY CALL FROM A MOBILE TERMINAL TO THE NEARBY EMERGENCY INSTITUTION (75) Inventor: Yoshio Muranaga, Tokyo (JP)

(73) Assignees: NEC Corporation, Tokyo (JP); IPC World, Inc., Tokyo (JP)

( * ) Notice: Subject to any disclaimer, the term of this patent is extended or adjusted under 35 U.S.C. 154(b) by 716 days.

(21) Appl. No.: 09/955,063

(22) Filed: Sep. 19, 2001

(65) Prior Publication Data

US 2002/0034960 A1 Mar. 21, 2002

(30) Foreign Application Priority Data

Sep. 19, 2000 (JP) ........................................ 2000-282953

(51) Int. Cl.[7] ................................................ H04Q 7/20
(52) U.S. Cl. .............................. 455/456.1; 455/404.1; 455/404.2
(58) Field of Search ........................... 455/456.1, 456.2, 455/456.3, 404.2, 457, 404.1; 379/37, 45, 67.1; 342/357.01

(56) References Cited

U.S. PATENT DOCUMENTS 6,477,363 B1 * 11/2002 Ayoub et al. ............. 455/404.2

FOREIGN PATENT DOCUMENTS

| EP | 0 875 878 | 11/1998 |
|----|-----------|---------|
| EP | 0 967 820 | 12/1999 |
| JP | A 8-186856 | 7/1996 |
| JP | 10-185609 | 7/1998 |
| JP | 11-53363 | 2/1999 |
| JP | 11-265413 | 9/1999 |
| JP | A 2000-182194 | 6/2000 |
| JP | 2000-206983 | 7/2000 |
| WO | WO 99/27716 | 6/1999 |
| WO | WO 99/30301 | 6/1999 |

OTHER PUBLICATIONS

Sakama, Hosamu; Development Toward Agent Transmission; NTT R&D; Japan; Corporate Communications Association; Jan. 10, 1997; vol. 46, No. 1, pp. 39–46 (Fiugure 7).

Takagawa, Yuichiro; "Man Navigation Servcie (phonetic) in which Japan Leads the World"; INTERNET Magazine; Japan; Impress Co., Ltd.; Jun. 1, 2000; vol. 65; pp. 238 to 239.

Saito, Masafumi; "W–CDMA and CDMA2000; Which is the World Standard?"; Weekly Journal, "Diamond Bit Business" (phonetic); Japan; Diamond Co., Ltd., Aug. 1, 2000; pp. 122–123.

* cited by examiner

Primary Examiner—Melur Ramakrishnaiah
(74) Attorney, Agent, or Firm—Young & Thompson (57) ABSTRACT

A mobile terminal includes a unit for acquiring position information. The mobile terminal sends an emergency call with the position information to a server. The server retrieves an emergency institution with reference to the position information and relays the emergency call to the retrieved emergency institution.

27 Claims, 7 Drawing Sheets

METHOD AND SYSTEM FOR SENDING AN EMERGENCY CALL FROM A MOBILE TERMINAL TO THE NEARBY EMERGENCY INSTITUTION

BACKGROUND OF THE INVENTION

This invention relates to a system for reporting an emergency call from a mobile communication terminal to an appropriate one of institutions, which include police, hospital and bank.

A lot of people visit foreign countries these days and consequently, there are a lot of people who trouble with accidents such as being involved in a traffic accident, losing money or article, being stolen, etc in a foreign country.

If you encounter such trouble in a foreign country, you would have to contact with the local police and/or ambulance. Further, if you do not have enough money to solve the trouble, you might also contact with your family in the homeland to ask him/her to send money to the nearby financial institution.

In these cases, a useful method of communication is telephone. Mobile telephone is particularly preferable because you can always keep your terminal in your pocket or bag to telephone. Recently, international roaming for mobile telephone has begun. Therefore, you can use the mobile telephone terminal that you use in the homeland. Thus, it can reassure you to carry a mobile telephone terminal with you in a foreign country.

On the other hand, emergency police/medical telephone number of a country is generally different from that of another country. Therefore, if you don't know the telephone number, you cannot telephone the institution you want to contact with even if you are carrying a mobile telephone with you. Furthermore, emergency in a foreign country exhausts you mentally and physically. Therefore, even if you have a mobile telephone terminal and know the suitable number, it should be difficult to dial the telephone number correctly and immediately.

In addition, you have to be concerned about difference in language. In order to ask help in a foreign country, after dialing the suitable number, you may have to describe where you are to a native speaking in a language which you cannot speak in.

Otherwise, you may suddenly have to prepare cash in a foreign country. For example, you may have your wallet stolen, or you may have to overstay because the flight you have reserved is canceled. It would be available for overcoming these difficulties that (1) you withdraw from an account which you have opened in your homeland; (2) you borrow money by a credit card; or (3) you ask your family to send money.

(1) and (2) are unreliable because financial institutions available for (1) and (2) are restricted. These ways require a financial institution near your current position that keeps your account or cooperates with a financial institution that keeps your account. However, it depends on your current position whether there is such a financial institution or not.

On the other hand, (3) does not require a specific financial institution. Therefore, you can receive money if there is any financial institution near your current position. Telegraphic transfer remittance is available for sending money from a financial institution in a country to a financial institution in another country. It is assumed that you are now travelling an area in a foreign country and you have opened no account at any financial institution in the area.

First, you telephone to your family or a friend in your homeland, tell her/him where you are and why you have called, and ask her/him to send desired amount of money to a teller's window of the financial institution nearby you.

In response to your telephone, your family or a friend goes to a financial institution in your homeland. Next, she/he designates a financial institution such as a bank, a teller's window of a local branch of the financial institution, a recipient (you) and amount of remittance in order to remit to you via the teller's window.

After that, you visit the teller's window, prove your identity with your passport and tell the teller's window that you come to receive money sent from a remitter's account in your homeland. The teller's window identifies you and then hands over remittance to you.

According to this method, a financial institution that a remitter sends money from does not have to be the same as a financial institution nearby a recipient. The recipient does not have to open a new account at a nearby financial institution in order to receive remittance. Some financial institutions require qualification to open an account. It is sometimes difficult for foreigners to satisfy the qualification. This method does not require such qualification, However, according to this method, the recipient must find out a financial institution in an unfamiliar area, and then, must communicate name of the financial institution, name of the branch of the financial institution, amount of remittance, etc to a remitter. In addition, though the recipient must make a teller of the financial institution identify him/herself in order to receive the remittance, the teller is not always able to speak in language that you can speak in.

If the recipient wishes to receive the remittance without fail, she/he should have experienced enough times such searching and procedure in foreign country where her/his language is not spoken. However, travelers mostly don't have such experience.

Furthermore, this method requires a remitter. Remitting money to a foreign financial institution is unfamiliar to most people. Thus, according to this method, both a remitter and a recipient must surmount various obstacles. This method is unsuitable to receive cash in a foreign country in case of emergency, except for a few ones who are used to traveling.

Hereinafter, documents showing conventional techniques relating to the present invention are referred below.

A Japanese unexamined patent publication number 2000-182194, namely 182194/2000, shows a method that after receiving an emergency call from a mobile terminal, an administration office requests a car mechanic, a policeman, an ambulance or the like to go into action. This document, however, does not show how to deal with a case when a user of the mobile terminal and one who receives the request speak different language from each other.

A Japanese unexamined patent publication number 08-186856, namely 186856/1996, shows a technique for "providing a mobile telephone device which automatically switches an international telephone code and emergency telephone numbers to current ones even if the user of the mobile telephone device moves through plural countries or areas" (paragraph 0005). This document also does not show how to deal with above-mentioned case. Further, according to this technique, though it is available to detect whether there is a mobile telephone device in a service area of a wireless station or not, it is unavailable to specify a current position of the mobile telephone device.

SUMMARY OF THE INVENTION

It is an object of the present invention to provide a system and computer program product for sending emergency call from a user to a nearby one of suitable emergency institutions, such as a police, hospital and bank, even if the user is in a foreign country. The user sends the emergency call with a mobile terminal of a mobile communication system. The emergency call includes position information that shows where the mobile terminal is, and is translated to a suitable language selected according to the position information before the emergency institution receives it.

It is another object of the present invention to provide a method, system and computer program product for sending money from the user's account that is opened at a bank in the homeland to a nearby bank in a foreign country. In order to send money, the user only has to operate the mobile terminal in the same simple operation in any countries.

It is another object of the present invention to provide various support services for use in emergency. The support services include translation and direction to a nearby one of suitable emergency institutions.

According to the present invention, a method of sending emergency call from a mobile terminal of a mobile communication system is provided. The mobile terminal comprises a unit for acquiring position information that shows where the mobile terminal is. The method comprises the steps of: locating the mobile terminal to generate the position information by the unit for acquiring; sending the emergency call with the position information from the mobile terminal to a server computer; retrieving one of emergency institutions with reference to the position information by the server computer; translating information including the position information to a language determined with reference to the position information by the server computer; and sending the translated information to the emergency terminal of the retrieved emergency institution.

The mobile communication system preferably provides international roaming service.

For example, the emergency institutions include at least one of police, medical and financial institutions.

The unit for acquiring may comprise a GPS (global positioning system). The method may further comprise the step of providing a support service for rising to an emergency to at least one of the mobile and emergency terminals.

The emergency call may include a message of first language and further comprise the steps of: inputting the message by an input device of the mobile terminal; sending the message from the mobile terminal to the server computer; machine-translating the message from the language to second language different from the first language by the server computer; and sending the translated message from the server computer to at least one of the mobile and emergency terminals.

The method may be as the following. The retrieved emergency institution is a financial institution, which is referred to as first financial institution. Another financial institution, which is referred to as second financial institution, identifies the user of the mobile terminal with reference to registration of the user for the mobile communication system. The second financial institution sends money to the first financial institution.

The method may further comprise the step of navigating the user of the mobile terminal to the retrieved emergency institution with reference to the position information. In this case, the directing step may comprise the steps of: sending map information including current position of the mobile terminal shown in the position information from the server computer to the mobile terminal; displaying the map information on a display device of the mobile terminal.

According to the present invention, a system for sending emergency call from a mobile terminal of a mobile communication system is provided. The system comprises a server computer and terminals for emergency institutions which are referred to as emergency terminals and receive the emergency call. The mobile terminal comprises a unit for acquiring position information that shows where the mobile terminal is and sends the position information to the server computer in response to predetermined operation by the user of the mobile terminal. The server computer retrieves one of the emergency institutions in response to the position information, translates information including the position information to a language determined with reference to the position information, and sends the translated information to the emergency terminal of the retrieved emergency institution.

The mobile communication system preferably provides international roaming service.

For example, the emergency institutions include at least one of police, medical and financial institutions.

The unit for acquiring may comprise a GPS.

The system may further comprise the unit for providing a support service for rising to an emergency to at least one of the mobile and emergency terminals.

When the emergency call includes a message of first language, and the mobile terminal comprises an input device for inputting the message and sends the message to the server computer, the server computer may translate the message from the language to second language different from the first language and sends the translated message to the retrieved emergency terminal.

When the retrieved emergency institution is a financial institution, which is referred to as first financial institution, and another financial institution, which is referred to as second financial institution, identifies the user of the terminal with reference to registration of the user for the mobile communication system, the second financial institution may send money to the first financial institution.

The server computer may send message for directing the user of the terminal to the retrieved emergency institution with reference to the position information, When the server computer comprises a storage device for storing map information and sends a part of the map information including current position of the terminal shown in the position information to the terminal, the terminal may comprise a display device for displaying the map information.

According to the present invention, a computer program product for execution by a server computer is provided. According to the computer program product, clients of the server computer comprise mobile terminals of a mobile communication system each of that comprises a unit for acquiring position information that shows where the terminal is, and terminals for emergency institutions. The computer program product comprises the computer codes for receiving the position information from the mobile terminal, retrieving one of the emergency institutions with reference to the received position information, translating information including the position information to a language determined with reference to the position information, and sending the translated information to the terminal of the retrieved emergency institution.

The mobile communication system preferably provides international roaming service.

For example, the emergency institutions include at least one of police, medical and financial institutions.

The unit for acquiring may comprise a GPS.

The computer program product may further comprise the computer code for providing a support service for rising to an emergency.

When the emergency call includes a message of first language, and the terminal comprises an input device for inputting the message and sends the message to the server computer, the computer program product may comprise computer codes for translating the message from the language to second language different from the first language and sends the translated message to the terminal.

When the retrieved emergency institution is a financial institution, which is referred to as first financial institution, the computer program product may comprise the computer codes for: sending another financial institution, which is referred to as second financial institution, a request for identifying the user of the mobile terminal with reference to registration of the user with the mobile communication system; and sending the second financial institution a request for sending money from the second financial institution to the first financial institution based on the identification.

The computer program product may comprise the computer code for sending message for directing the user of the terminal to the retrieved emergency institution with reference to the position information.

According to the present invention, a computer comprising a storage device that stores the computer program product is provided.

According to the present invention, a computer program product for execution by a mobile terminal of a mobile communication system is provided. The mobile terminal comprises a unit for acquiring position information that shows where the mobile terminal is. The computer program product comprises the computer codes for: generating the position information by the unit for acquiring in response to predetermined input operation from an input device of the mobile terminal; sending emergency call including the position information to a predetermined server computer.

According to the present invention, a mobile terminal of a mobile communication system comprising a storage device for storing the above-mentioned computer program product for execution by a mobile terminal. The input device is preferably used only for inputting the predetermined input operation.

DESCRIPTION OF THE PREFERRED EMBODIMENTS

Description will be made about an embodiment, an emergency call system 100 of the present invention.

1. Construction of the emergency call system 100

Figure 1:
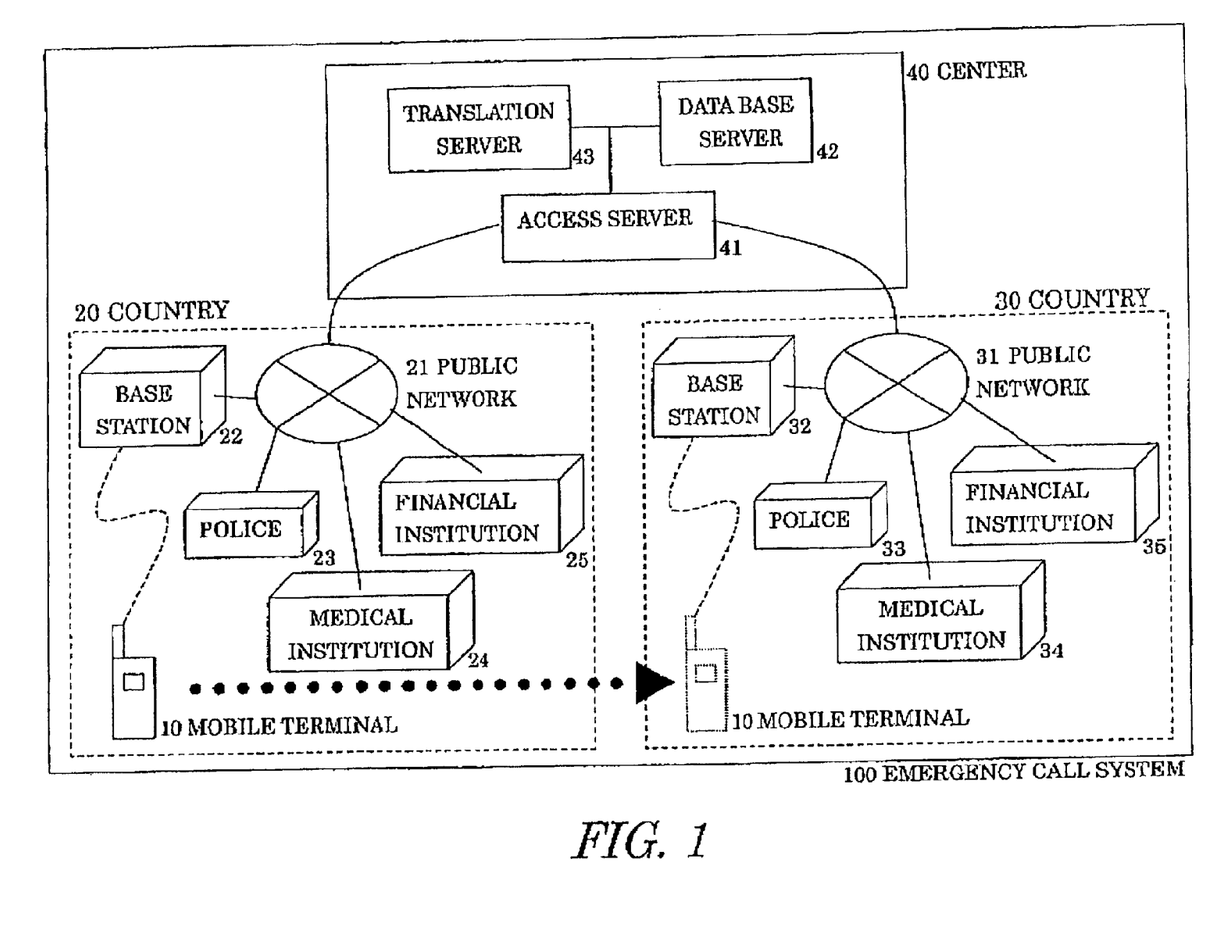
FIG. 1 shows a block diagram for use in describing an emergency call system 100 of the present invention.

A mobile terminal 10 is a terminal of a mobile communication system such as cellular phone system. The mobile communication system is capable of international roaming. In FIG. 1, the mobile terminal 10 is available in both a country 20 and country 30.

In the country 20, a public network 21 is laid and is connected with a base station 22, police terminal 23, medical institution terminal 24 and financial institution terminal 25. The police terminal 23 is a communication terminal geographically nearest from the mobile terminal 10. The police terminal 23 corresponds to a terminal that receives an emergency call when someone dials the emergency police telephone number such as 110 in Japan in the area including the police terminal 23. The medical institution terminal 24 is a communication terminal set in the medical institution geographically nearest from the mobile terminal 10. A typical medical institution is an emergency hospital. The financial institution terminal 25 is a communication terminal set in the financial institution geographically nearest from the mobile terminal 10. Financial institutions are places from which the user receives remittance. Typically, the financial institution is a bank, limited-service bank, credit association or other non-bank financial institution. When the mobile terminal 10 moves in the country 20, the mobile terminal 10 are connected with a base station 32, police terminal 33, medical institution terminal 34 and financial institution terminal 35 via a public network 31.

Figure 2:
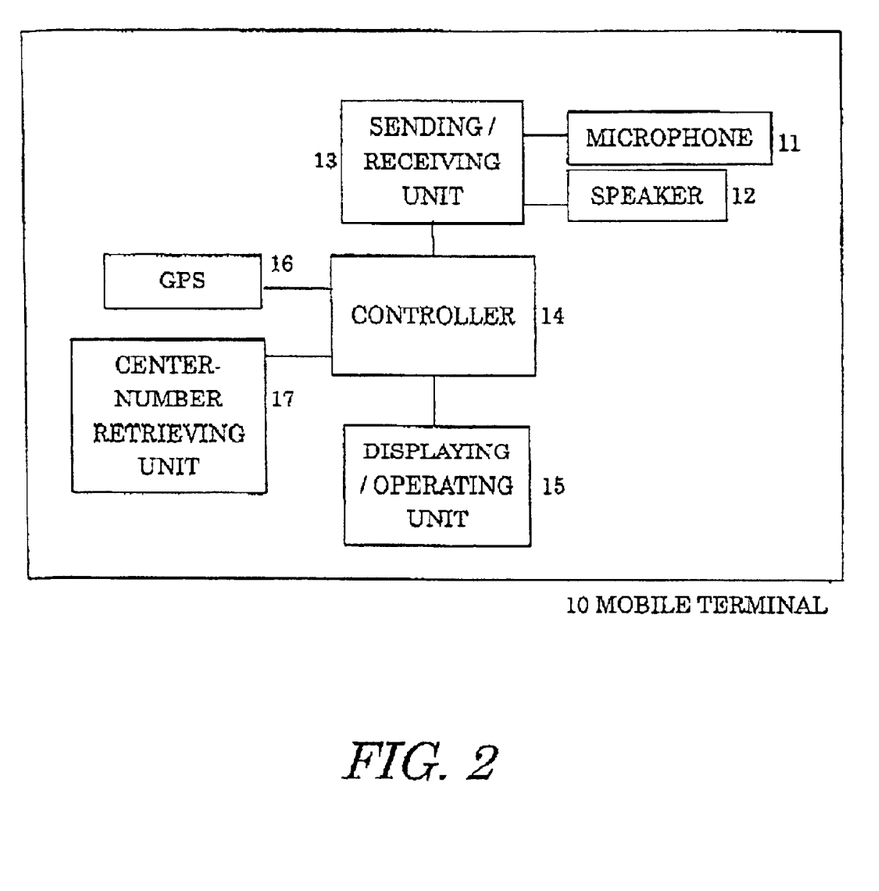
FIG. 2 shows a block diagram for use in describing a mobile terminal 10 of the emergency call system 100.

A center 40 is the hub of the emergency call system 100 and includes an access server 41, database server 42 and translation server 43. The access server 41 provides the center 40 with access to the public networks 21 and 31. The database server 42 stores a database and manages the database. The database includes ranges of coordinates showing domains of countries, emergency telephone numbers for calling the police and an ambulance, etc. The translation server 43 performs a machine translation program that translates input text message, The center 40 may be installed in either the country 20, 30 or another. As shown in FIG. 2, the mobile terminal 10 includes a microphone 11, speaker 12, sending/receiving unit 13, controller 14, displaying/operating unit 15, GPS (global positioning system) 16 and center-number retrieving unit 17. The displaying/operating unit 15 includes a display device and numeric keys. In addition, the displaying/operating unit 15 includes two emergency call keys one of that is only for use in calling for the police, and the other of that is only for use in calling for an ambulance. The GPS 16 acquires a position information. The controller sends the position information to the center-number retrieving unit 17. The center-number retrieving unit 17 selects an international phone code with reference to the position information and outputs the international phone code, the country code of the country in which the center 40 is installed, and the telephone number of the center 40.

2. Sending an emergency call to the police or a medical institution

Figure 3:
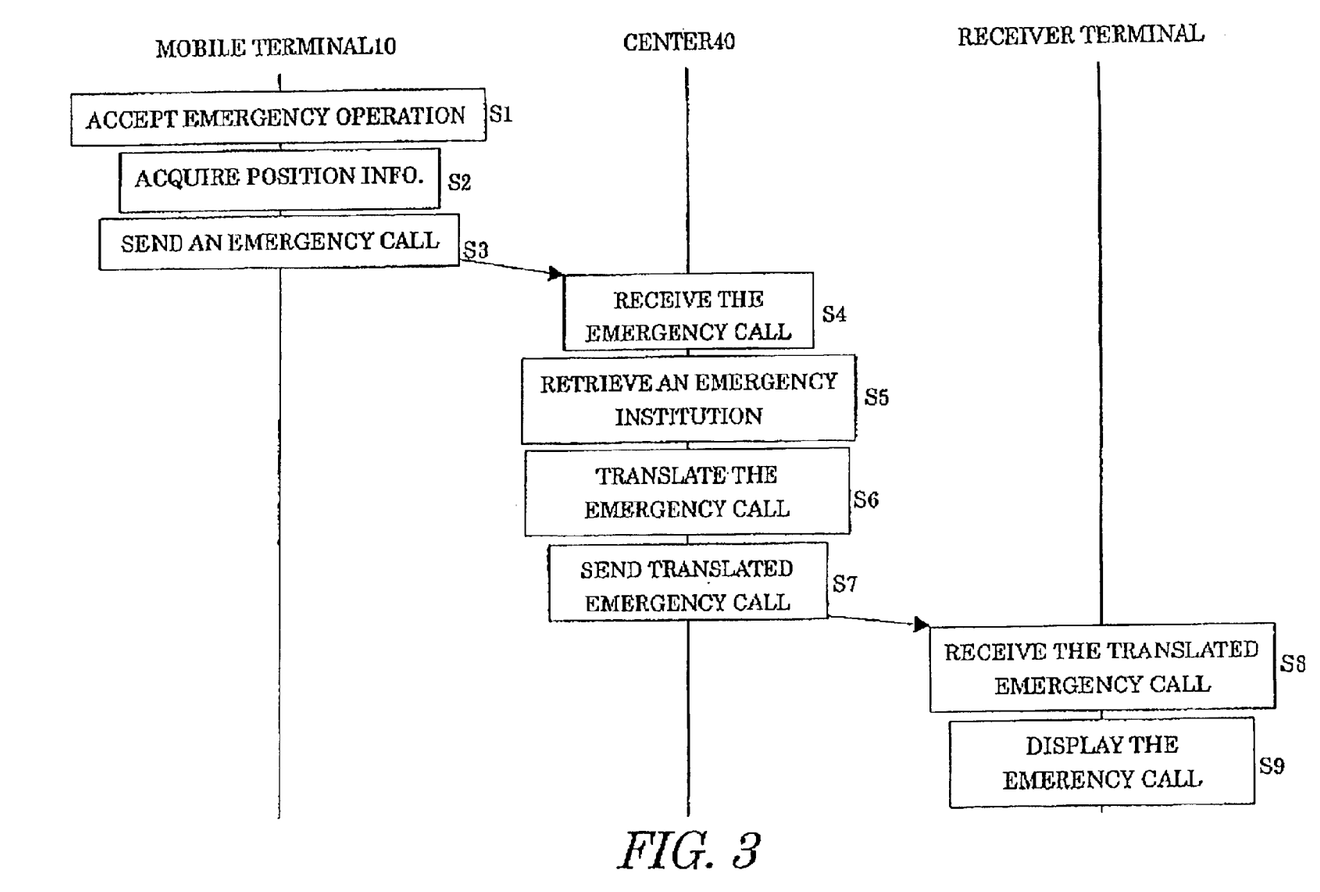
FIG. 3 shows a flowchart for use in describing how to send an emergency call from the mobile terminal 10 to an emergency terminal.

With reference to FIG. 3, description will be made about sending an emergency call from the mobile terminal 10 to the police 33 in the emergency call system 100.

When a user of the mobile terminal 10 meets with an accident and needs help of the police, the user pushes the emergency call key for the police (Step S1).

In response to this operation, the controller 14 makes the GPS 16 acquire current position information (Step S2). The center-number retrieving unit 17 retrieves the telephone number for dialing the center 40. The sending/receiving unit 13 dials the retrieved telephone number. After the access server 41 accepts the dialing, the mobile terminal 10 sends an emergency call to the center 40 (Step S3).

The emergency call includes the position information and an emergency call type, which shows whether the emergency call is sent to the police or a medical institution. In this case, the emergency call key for the police was pushed at the Step S1 and therefore the emergency call type included in the emergency call shows that the emergency call is to be sent to the police. The emergency call is sent to the access server 41 via the base station 32 and the public network 31.

When the access server 41 receives the emergency call (Step S4), the database server 42 retrieves a telephone number of an appropriate institution with reference to the position information and the emergency call type included in the emergency call (Step S5).

The access server 41 may furthermore acquire the telephone number of the mobile terminal 10 with a caller ID service in order to retrieve the personal information of the user previously stored in the database server 42 with reference to the telephone number of the mobile telephone 10.

The translation server 43 translates predetermined information including necessary part of the position information, the emergency call type and the personal information to a language that is decided with reference to the appropriate institution (Step S6). The language is spoken at the institution. Then, the access server 41 dials the telephone number retrieved at Step S5 to send information including translated one to the receiver terminal, namely the police terminal (Step S7).

When the police terminal 33 receives the information sent at Step S7 (Step S8), the police terminal 33 displays a warning message and/or sounds an alarm in order to urge the operator of the police terminal 33 to dispatch policemen to the point shown by the position information.

After arrival of the policemen at the point, the user of the mobile terminal 10 has to communicate with them. However, the user and the policemen are not always able to speak the same language, The emergency call system 100 can assist them with communication by providing a machine translation service to the user.

Figure 4:
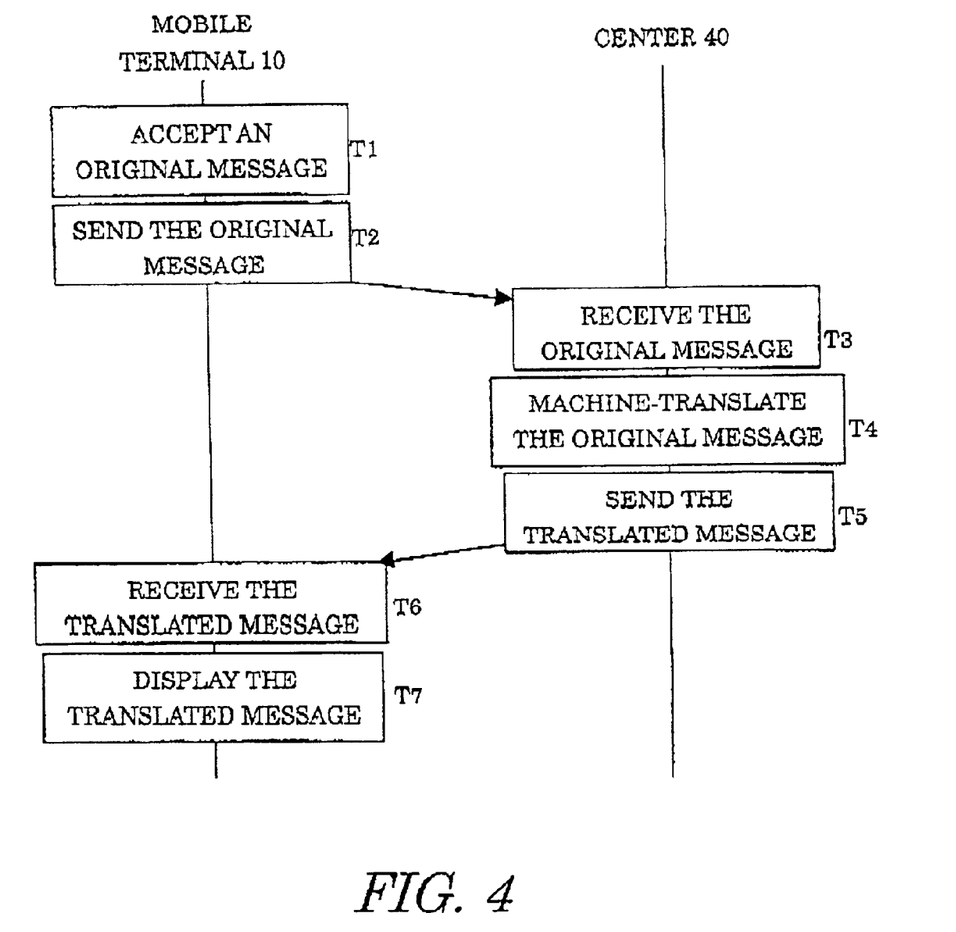
FIG. 4 shows a flowchart for use in describing how to machine-translate a message that is input from/output to the mobile terminal 10.

The machine translation service is described below with reference to FIG. 4. First, the user inputs original message by the displaying/operating unit 15 (Step T1). The mobile terminal 10 sends the original message with designation of language to the translation server 43 via the base station 32, the public network 33 and the access server 41 (Steps T2, T3). The translation server 43 translates the original message to a message written in the designated language (Step T4), and then sends the translated message back to the mobile terminal 10 (Steps T5, T6). The mobile terminal 10 receives the translated message and displays it on the displaying/operating unit 15 (Step T7).

Above-mentioned description was made about sending an emergency message to the police terminal 33. The same description fits sending an emergency call to the medical institution 34.

3. Request for remitting money from the user's financial institution to the nearby one With reference to FIG. 5, description will be made about requesting for remitting money from a financial institution, which the user has already opened an account, to another one, which stands nearby the user. It is assumed that the user has already opened an account at a financial institution 25 in the country 20; the user is now staying the country 30; and the financial institution nearest the user is a financial institution 35.

Figure 5:
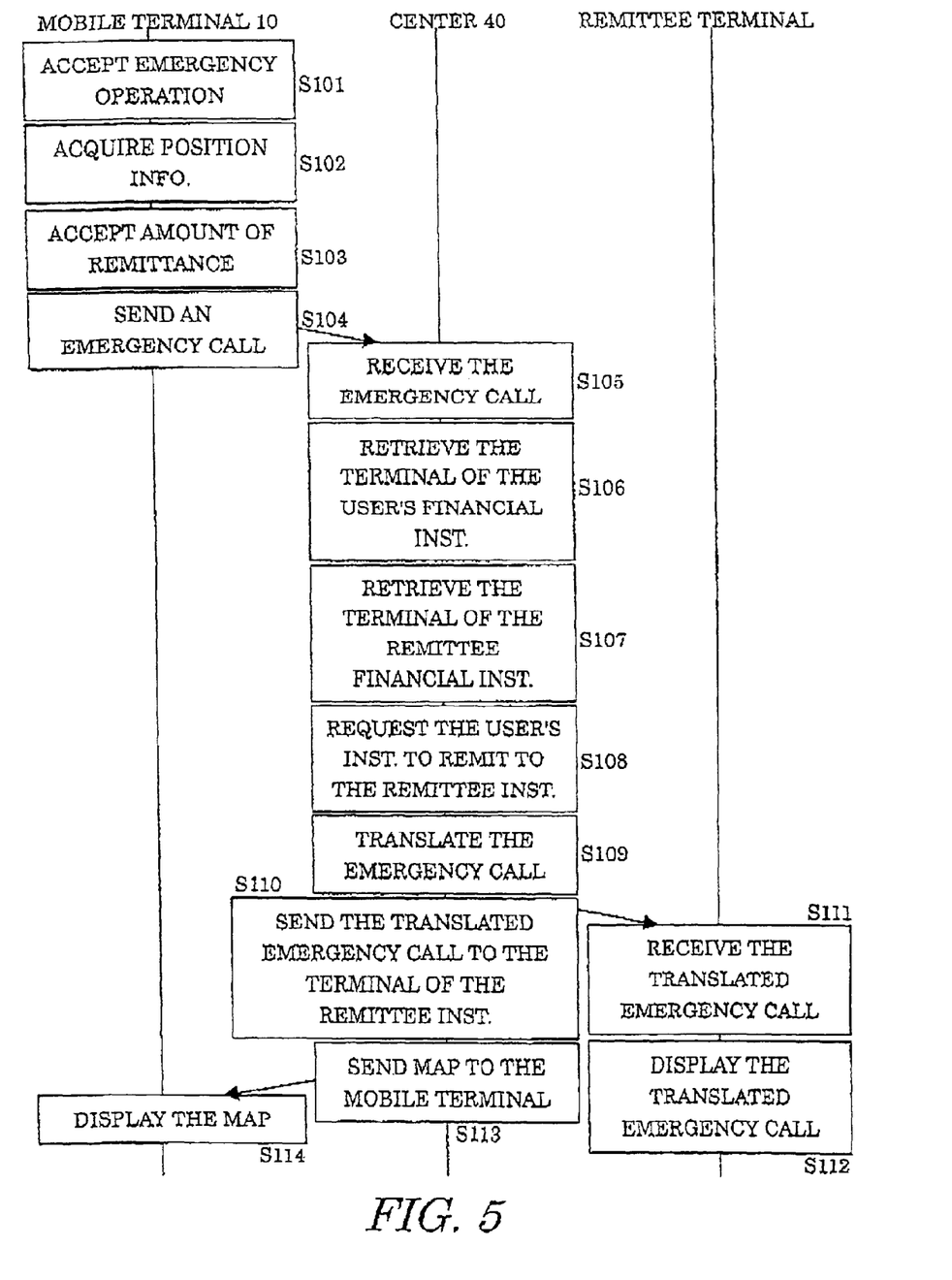
FIG. 5 shows a flowchart for use in describing how to request a financial institution to remit money to the financial institution nearest the user of the mobile terminal 10.

When the user requires cash, the user pushes an emergency remittance key of the displaying/operating unit 15 (Step S101). In response to the key operation, first, the controller 14 acquires current position information by the GPS 16 (Step S102). Next, the controller 14 requests the user to input desired amount of remittance from the displaying/operating unit 15 (Step S103). Then, the controller 14 retrieves the telephone number of the center 40 by the center-number retrieving unit 17. Next, the sender/receiver unit 13 dials the retrieved telephone number, and after the center 40 accepts the calling, sends an emergency call to the center 40 (Step S104). The emergency call includes not only the position information and emergency call type, namely remittance request, but also amount of remittance.

When the access server 41 receives the emergency call (Step S105), the database server 42 retrieves the telephone number of the financial institution 25, at which the user's account has already been opened, with reference to registration of the user (Step S106). Next, the access server 41 retrieves the financial institution nearest the mobile terminal 10, namely the financial institution 35, with reference to the position information and the emergency call type (Step S107).

Then, the access server 41 requests the financial institution 25 to send money from the user's account to the financial institution 35 (Step S108). In response to the request, the financial institution 25 sends money to the financial institution 35 by telegraphic transfer remittance. Methods of requesting remittance/remitting money from one financial institution to another one, namely method of online banking is already known, therefore more description about the method is omitted. Next, the access server 41 translates information including amount of remittance and the user's name to a language spoken in the country 30 (Step S109), and dials the telephone number retrieved at Step S106 to send the translated information to the financial institution 35 (Step S110).

When the terminal of the financial institution 36 receives the translated information (Step S111), the terminal displays a warning message and/or sounds an alarm to call its operator's attention, and tells the operator that the user has sent money from his/her account at the financial institution 25 to the teller's window of the financial institution 35 by telegraphic transfer remittance and will come to receive the remittance soon.

The amount of remittance may be previously defined, In this case, the user has only to push the emergency remittance key to send definite amount of remittance, namely Step S103 may be omitted.

The user may not know where the financial institution 35 is. In order to direct the user to the financial institution 35, the database server 42 stores map information of countries and sends the map information showing the route from the current position of the mobile terminal 10 to the financial institution 35 (Step S113). The mobile terminal 10 receives and displays the map information in order to guide the user to the financial institution 35 (Step S114).

Figure 6:
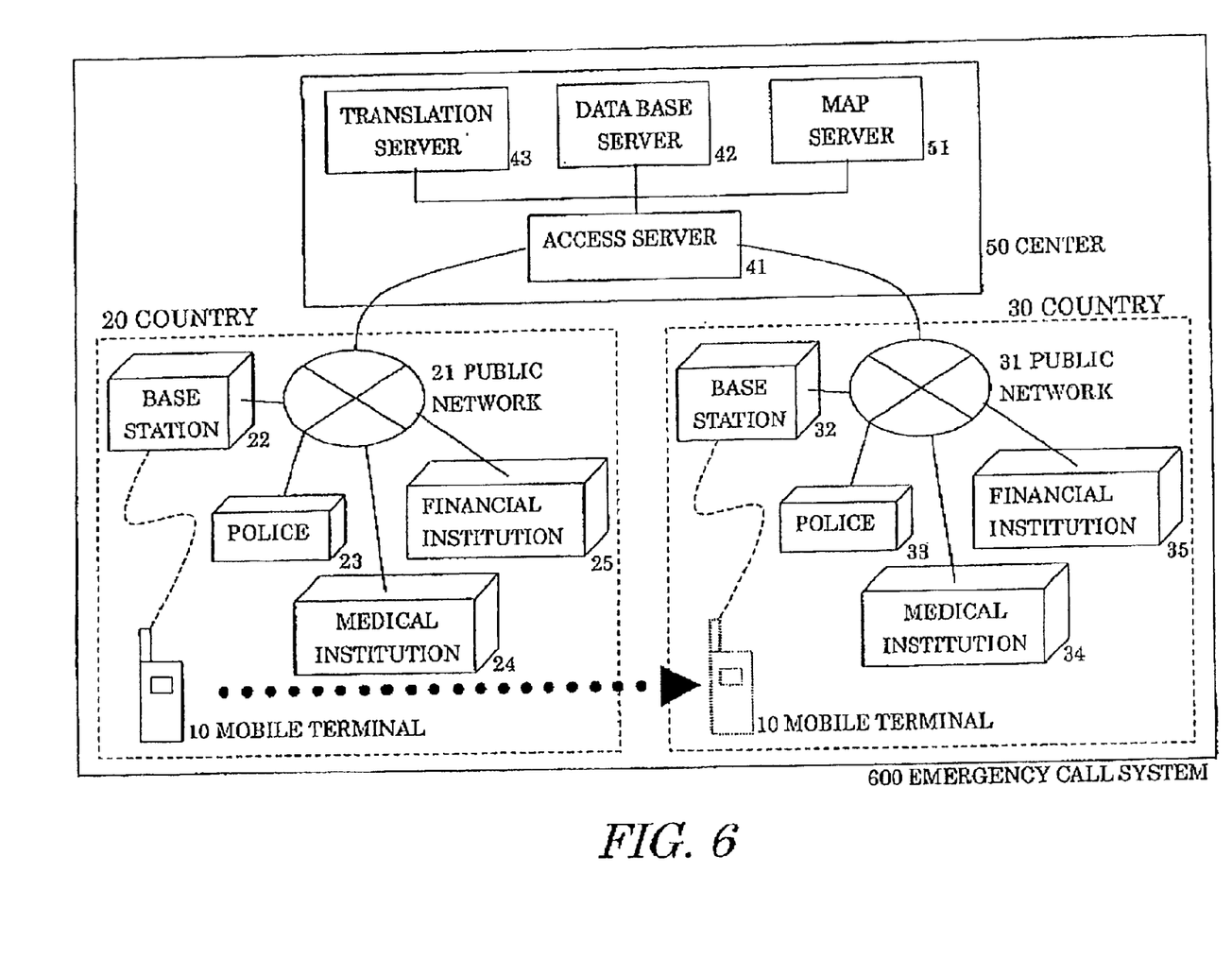
FIG. 6 shows a block diagram for use in describing an emergency call system 600.

In order to make sure of the user's arrival at the financial institution 35, an emergency call system 600 is provided. As shown in FIG. 6, compared with the center 40 of the emergency call system 100, the center 50 of the emergency call system 600 further includes a map server 51 for storing map image and sending the map image around current position of the mobile terminal 10 with reference to the position information. The map server 51 provides map information updated with reference to current position of the mobile terminal 10 and shows the direction to the financial institution 35 to guide the user to the financial institution 35.

Figure 7:
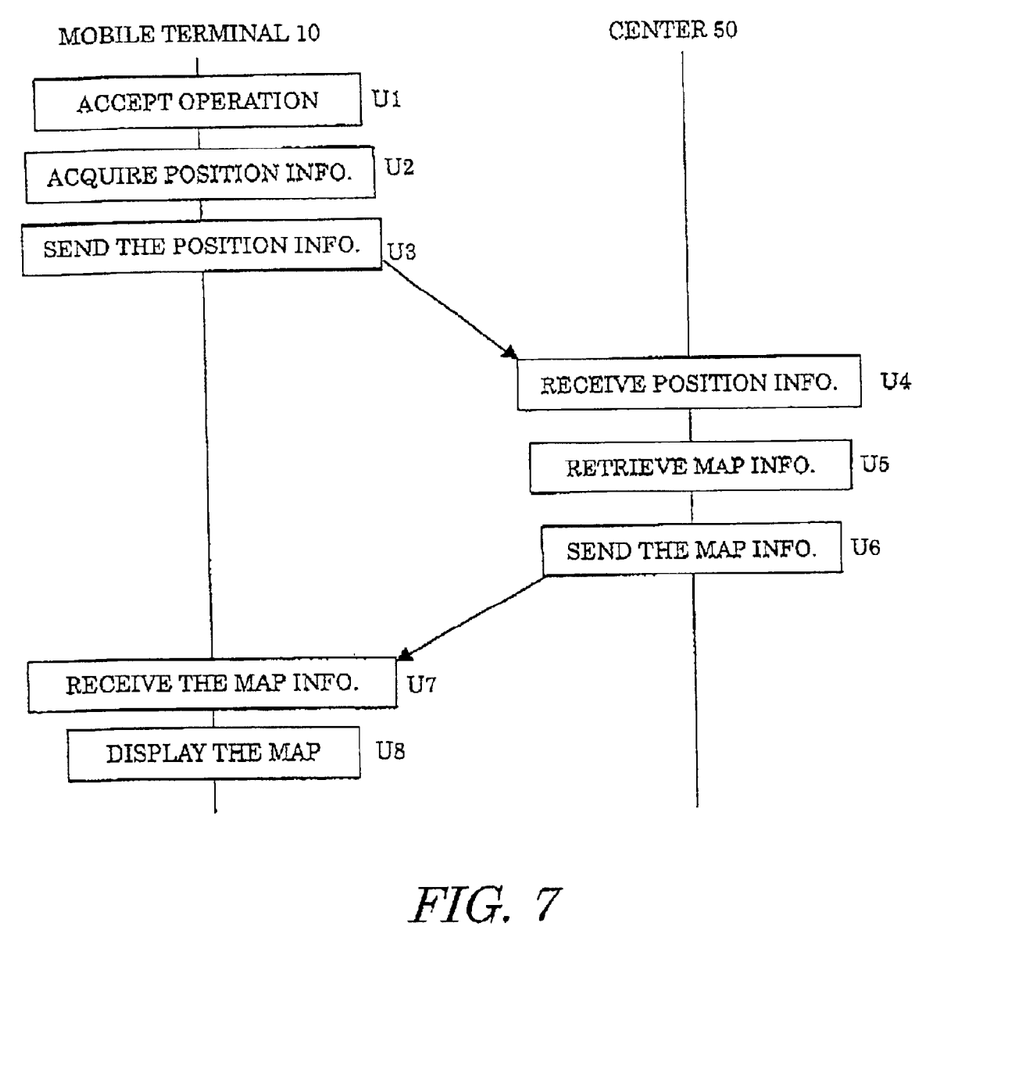
FIG. 7 shows a flowchart for use in describing how to display map around the use of the mobile terminal 10 on the display device of the mobile terminal 10.

When the user wants to know where she/he is and which direction she/he should go to, the user pushes a route guide key of the displaying/operating unit 15 (Step U1). In response to the key operation, the GPS 16 acquires position information (Step U2) and sends the position information to the center 50 (Step U3).

When the access server 41 receives the position information (Step U4), the map server 51 retrieves the map information including the position designated by the received position information (Step U5), and then sends the map information to the mobile terminal 10 (Step U6).

After that, the mobile terminal 10 receives the map information (Step U7) and displays the map information on the display device of the displaying/operating unit 15 (Step U8).

Steps U2 to U8 may be autonomously performed. In this case, the display device of the mobile terminal 10 always shows map around the user. Therefore, the user can arrive at the financial institution 35 more easily.

After arrival at the financial institution 35, the user must communicate with the teller to receive the remittance. In order to assist communication between the user and the teller of the financial institution 35, translation described in FIG. 4 is also available.

While this invention has thus far been described in conjunction with a few embodiments thereof, it will be readily possible for those skilled in the art to put the this invention into various other manners.

For example, if the mobile terminal 10 can access the access server 41 by dialing a unique telephone number in any country, it is unnecessary to retrieve the telephone number of the access server 41. In this case, therefore, the mobile terminal 10 may not include the center-number retrieving unit 17.

If the mobile communication system of the mobile terminal 10 requires different international phone code according to the country in which the mobile terminal 10 dials, then the country has to be identified. In above-mentioned description, the center-number retrieving unit 17 identifies current country with reference to the position information. However, this identification may be done according to another method. For example, a document "Total access communications system, mobile station-landstation compatibility specification, issue 4" shows a description about an area identification code. Before sending an emergency call from the mobile terminal 10 to the base station 22/32, the mobile terminal 10 may receive the area identification code from a near base station, and select an international phone code with reference to the area identification code to send the emergency call.

Furthermore, in above-mentioned description, there is only one center 40/50 in the emergency call system 100/600. However, the center 40/50 may be stood in each country and all of the centers may cooperate with each other. In this case, the area identification code may be referred to access the nearest center.

Furthermore, in above-mentioned description, the displaying/operating unit 15 includes an emergency call key for sending the emergency call. However, the emergency call may be sent in response to pushing predetermined combination of numeric keys or pushing numeric keys in predetermined order, instead of pushing a proprietary key for emergency call.

And furthermore, the center 40/50 may send personal information, which includes appearance of the user, with the position information to the receiver terminal. In this case, the access server 41 receives the user's identifier, such as the telephone number of the mobile terminal 10. With reference to the identifier, the database server 42 retrieves the user's name, age, height, weight, color of skin and eye, etc and sends them with position information at Step S7 to the receiver terminal. In this case, the person dispatched to the user can easily identify the user.

As mentioned above, according to the present invention, the user of the mobile terminal can easily call for the local police or ambulance. When the user wants to call for the police or ambulance, the user only has to operate in the same way even if the user is in any country. The user does not have to know their telephone number to dial. Particularly, when the mobile terminal 10 includes an emergency call key for calling for them, the user only has to push a single key to access them. Therefore, even if the user is flustered, the user can surely access these institutions.

Furthermore, the user can send money from her/his own account to the nearby financial institution by telegraphic transfer remittance. Business connections between the user's financial institution and the nearby financial institution are not required for telegraphic transfer remittance. The user does not have to ask her/his family or friends to send money.

And furthermore, the user can communicate current position with the local police or medical institution, even if the user cannot speak a local language. Position information of the mobile terminal is sent to the local police or medical institution when the user operates the mobile terminal.

What is claimed is:

1. A method of sending emergency call from a mobile terminal of a mobile communication system, the mobile terminal comprising means for acquiring position information that shows where the mobile terminal is, comprising the steps of:

locating the mobile terminal to generate the position information by the means for acquiring;

sending the emergency call with the position information from the mobile terminal to a server computer;

retrieving one of emergency institutions with reference to the position information by the server computer;

translating information including the position information to a language determined with reference to the position information by the server computer; and sending the translated information to the emergency terminal of the retrieved emergency institution.

2. The method claimed in claim 1, wherein the mobile communication system provides international roaming service.

3. The method claimed in claim 1, wherein the emergency institutions include at least one of police, medical and financial institutions.

4. The method claimed in claim 1, wherein the means for acquiring comprises a GPS (global positioning system).

5. The method claimed in claim 1, further comprising the step of providing a support service for rising to an emergency to at least one of the mobile and emergency terminals.

6. The method claimed in claim 1, wherein the emergency call includes a message of first language, further comprising the steps of:

inputting the message by an input device of the mobile terminal;

sending the message from the mobile terminal to the server computer;

machine-translating the message from the language to second language different from the first language by the server computer; and sending the translated message from the server computer to at least one of the mobile and emergency terminals.

7. The method claimed in claim 1, wherein:

the retrieved emergency institution is a financial institution, which is referred to as first financial institution;

another financial institution, which is referred to as second financial institution, identifies the user of the mobile terminal with reference to registration of the user for the mobile communication system; and the second financial institution sends money to the first financial institution.

8. The method claimed in claim 1, further comprising the step of directing the user of the mobile terminal to the retrieved emergency institution with reference to the position information.

9. The method claimed in claim 8, wherein the directing step comprises the steps of:

sending map information including current position of the mobile terminal shown in the position information from the server computer to the mobile terminal;

displaying the map information in a display device of the mobile terminal.

10. A system for sending emergency call from a mobile terminal of a mobile communication system, comprising a server computer and terminals for emergency institutions which are referred to as emergency terminals and receive the emergency call, wherein:

the mobile terminal comprises means for acquiring position information that shows where the mobile terminal is and sends the position information to the server computer in response to predetermined operation by the user of the mobile terminal;

the server computer retrieves one of the emergency institutions in response to the position information, translates information including the position information to a language determined with reference to the position information, and sends the translated information to the emergency terminal of the retrieved emergency institution.

11. The system claimed in claim 10, wherein the mobile communication system provides international roaming service.

12. The system claimed in claim 10, wherein the emergency institutions include at least one of police, medical and financial institutions.

13. The system claimed in claim 10, wherein the means for acquiring comprises a GPS (global positioning system).

14. The system claimed in claim 10, further comprising the means for providing a support service for rising to an emergency to at least one of the mobile and emergency terminals.

15. The system claimed in claim 10, wherein:

the emergency call includes a message of first language;

the mobile terminal comprises an input device for inputting the message and sends the message to the server computer; and the server computer translates the message from the language to second language different from the first language and sends the translated message to the retrieved emergency terminal.

16. The system claimed in claim 10, wherein:

the retrieved emergency institution is a financial institution, which is referred to as first financial institution;

another financial institution, which is referred to as second financial institution, identifies the user of the terminal with reference to registration of the user for the mobile communication system; and the second financial institution sends money to the first financial institution.

17. The system claimed in claim 10, wherein the server computer sends message for directing the user of the terminal to the retrieved emergency institution with reference to the position information.

18. The system claimed in claim 17, wherein:

the server computer comprises a storage device for storing map information and sends a part of the map information including current position of the terminal shown in the position information to the terminal; and the terminal comprises a display device for displaying the map information.

19. A computer program product for execution by a server computer, wherein:

clients of the server computer comprise mobile terminals of a mobile communication system each of that comprises means for acquiring information that shows where the terminal is, and terminals for emergency institutions;

the computer program product comprises the computer codes for receiving the position information from the mobile terminal, retrieving one of the emergency institutions with reference to the received position information, translating information including the position information to a language determined with reference to the position information, and sending the translated information to the terminal of the retrieved emergency institution.

20. The computer program product claimed in claim 19, wherein the mobile communication system provides international roaming service.

21. The computer program product claimed in claim 20, wherein the emergency institutions include at least one of police, medical and financial institutions.

22. The computer program product claimed in claim 20, wherein the means for acquiring comprises a GPS (global positioning system).

23. The computer program product claimed in claim 20, further comprising the computer code for providing a support service for rising to an emergency.

24. The computer program product claimed in claim 23, wherein:

the emergency call includes a message of first language, and the terminal comprises an input device for inputting the message and sends the message to the server computer;

the computer program product comprises computer codes for translating the message from the language to second language different from the first langauge and sends the translated message to the terminal.

25. The computer program product claimed in claim 23, wherein the retrieved emergency institution is a financial institution, which is referred to as first financial institution, comprising the computer codes for:

sending another financial institution, which is referred to as second financial institution, a request for identifying the user of the mobile terminal with reference to registration of the user with the mobile communication system; and sending the second financial institution a request for sending money from the second financial institution to the first financial institution based on the identification.

26. The computer program product claimed in claim 23, comprising the computer code for sending message for directing the user of the terminal to the retrieved emergency institution with reference to the position information.

27. A computer comprising a storage device that stores the computer program product claimed in claim 19.

* * * * *